United States Patent
Jenkins

(10) Patent No.: US 9,677,358 B2
(45) Date of Patent: Jun. 13, 2017

(54) FLUID RELEASE MECHANISM FOR A CHEMICALLY-INFLATABLE BAG

(71) Applicant: STEMLOCK, INCORPORATED, Lee's Summit, MO (US)

(72) Inventor: Thomas S. Jenkins, Lee's Summit, MO (US)

(73) Assignee: STEMLOCK, INCORPORATED, Lee's Summit, MO (US)

( * ) Notice: Subject to any disclaimer, the term of this patent is extended or adjusted under 35 U.S.C. 154(b) by 620 days.

(21) Appl. No.: 14/166,074

(22) Filed: Jan. 28, 2014

(65) Prior Publication Data

US 2015/0211325 A1    Jul. 30, 2015

(51) Int. Cl.
| | | |
|---|---|---|
| *E21B 23/06* | (2006.01) | |
| *B01F 13/00* | (2006.01) | |
| *B01J 7/02* | (2006.01) | |
| *F42D 1/16* | (2006.01) | |
| *F42D 1/18* | (2006.01) | |
| *F42D 1/20* | (2006.01) | |
| *F42D 1/22* | (2006.01) | |

(52) U.S. Cl.
CPC ........ *E21B 23/065* (2013.01); *B01F 13/0022* (2013.01); *B01J 7/02* (2013.01); *F42D 1/16* (2013.01); *F42D 1/18* (2013.01); *F42D 1/20* (2013.01); *F42D 1/22* (2013.01)

(58) Field of Classification Search
CPC ........ E21B 23/065; B01J 7/02; B01F 13/0022
See application file for complete search history.

(56) References Cited

U.S. PATENT DOCUMENTS

| | | | | |
|---|---|---|---|---|
| 3,064,802 A | * | 11/1962 | Thurman | B65B 29/10 206/219 |
| 3,777,949 A | * | 12/1973 | Chiquiari-Arias | B65D 1/095 222/541.8 |
| 4,630,727 A | * | 12/1986 | Feriani | A61J 1/2093 206/221 |
| 4,846,278 A | | 7/1989 | Robbins | |

(Continued)

FOREIGN PATENT DOCUMENTS

FR    WO0244045    *    6/2002    ............. B65D 35/06

OTHER PUBLICATIONS

STEMLOCK Incorporated, Stemlock Gas Bags re Self-Inflating Borehole Plug for Aur Deck Blasting brochure, undated.

(Continued)

*Primary Examiner* — George Gray
(74) *Attorney, Agent, or Firm* — Shook, Hardy & Bacon L.L.P.

(57) ABSTRACT

The present invention is directed towards an apparatus for providing a process for sealing an opening formed in the ground with a chemically-inflatable bag. The chemically-inflatable bag contains two or more chemical reactants, one of which is a liquid reactant that is initially stored in a liquid-containing device. The liquid-containing device has a removable cap, which upon removal or breakage of the cap permits the liquid reacting agent to contact and react with another reacting agent. The chemical reaction produces carbon dioxide, which expands the chemically-inflatable bag from a collapsed condition to an inflated condition. In the inflated condition, the chemically-inflatable bag fills and protects the integrity of the formed cavity.

12 Claims, 5 Drawing Sheets

(56) References Cited

U.S. PATENT DOCUMENTS

| | | | | |
|---|---|---|---|---|
| 5,006,004 | A * | 4/1991 | Dirksing | A45D 19/02 401/261 |
| 6,021,802 | A * | 2/2000 | Leifels | B67D 7/344 137/320 |
| 6,619,387 | B2 | 9/2003 | Jenkins et al. | |
| 6,722,105 | B2 * | 4/2004 | Jenkins | E21B 33/134 53/449 |

OTHER PUBLICATIONS

STEMLOCK Incorporated, Gas Bags, The Self-Inflating Borehole Plug flyer, undated.

* cited by examiner

FLUID RELEASE MECHANISM FOR A CHEMICALLY-INFLATABLE BAG

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

The present invention relates generally to mining and/or drilling operations. More specifically, the present invention relates to improvements in a chemically-inflatable bag for use in sealing an explosive column.

Typically, boreholes are dug and used as explosive columns. Detonation of a typical, full column confined charge produces a single high amplitude stress wave that crushes the borehole wall and moves out into the surrounding rock producing a crack mechanism. In conjunction with the stress wave, high temperature gases assist in extending the crack formation and moving the rock mass of the ground and sublayers.

By incorporating an air gap (air deck) above, below, or within the explosive column, shock wave reflections within the borehole produce a secondary stress wave. This wave extends the crack formation before gas pressurization. The reduced borehole pressure caused by the air column reduces excessive crushing of the rock adjacent to the borehole wall but still is capable of extending the crack formation and moving the rock out away from the opening of the hole. Air deck volumes of up to about 50% can be used before there is any reduction in fragmentation. By using an air deck, smaller amounts of explosives may be used without much change in fragmentation.

Self-inflating plugs are used to seal boreholes at various depths. A problem with self-inflating plugs currently available is that precise amounts of acid are not used, thus causing variations in performance. In some cases, vinegar is used as the acid, and the concentration of acid in the vinegar is not always consistent. Still another disadvantage with currently available self-inflating plugs is that they are folded such that the folds sometimes prevent them from fully inflating and expanding.

Yet another disadvantage with currently available self-inflating plugs are the way in which the reacting agents are released, causing the self-inflating plugs to inflate. In prior art self-inflating plugs, often an unfurling action is necessary to create a moment of inertia to the bag or other compromising action to the bag is necessary to initiate a reaction between a first reacting agent (powder) and a second reacting agent (liquid). Consequently, a chemical reaction is invoked by introducing the displaced portion of the second reacting agent to the first reacting agent reactant, where a by-product of the chemical reaction is a gas, often $CO_2$. As such, the self-inflating plug expands to an inflated condition by way of the gas being generated by the chemical reaction. It is these such actions that have resulted in difficulties inflating the self-inflating plugs. In other prior art self-inflating plugs, in order to initiate the reaction, it is necessary to break the liquid containing device by stepping or stomping on the self-inflating plug. However, this stepping or stomping action has been known to damage self-inflating plugs.

In order to overcome these disadvantages, an improved self-inflating plug is provided. This self-inflating plug, or chemically-inflatable bag, is able to more easily inflate to fit within a borehole.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Generally, an exemplary embodiment of the present invention relates to a chemically-inflatable bag that may be deployed manually by a user to serve, in instances, as an obstruction within a hole in the ground or in any other formed cavity in any environment.

In an embodiment of the present invention, a cap for sealing an opening of a fluid-containing device contained within a chemically-inflatable bag is disclosed. The cap comprises an attachment means for removably securing the cap to the fluid-containing device and a tip portion extending from the attachment means. The tip portion has a tip length sufficient in size such that the tip length is breakable. Upon a breaking of the tip length, fluid from within the fluid-containing device exits into the chemically-inflatable bag and mixes with a reacting agent, also contained in the chemically-inflatable bag, producing a gas that inflates the bag.

In an alternate embodiment of the present invention, a removable cap for use in sealing an opening of a fluid-containing device of a chemically-inflatable bag is disclosed. The removable cap comprises a generally collar-shaped member that slides about an opening of the fluid-containing device. The collar-shaped member has an inner wall, an opposing outer wall and a recess formed within the inner wall. The collar-shaped member also has a first face and an opposing second face with a backplate secured to the second face such that the cap slides about an opening of the fluid-containing device and the backplate closes off the opening of the fluid-containing device.

In yet another embodiment of the present invention, a chemically-inflatable bag for use as a borehole plug is disclosed. The chemically-inflatable bag comprises a first reacting agent contained therein, and a fluid-containing device also positioned within the chemically-inflatable bag, where the fluid-containing device contains a second reacting agent. The fluid-containing device has an opening and a removable cap secured to the opening such that upon application of a force to the cap, fluid is permitted to flow through the opening of the fluid containing device and contact the first reacting agent causing the chemically-inflatable bag to inflate. The first reacting agent may be loose within the chemically-inflatable bag or contained within a water soluble bag.

Typically, as discussed above, the chemically-inflatable bag is used to fill a drilled hole to prevent backfill or to protect it from erosion by causing the chemically-inflatable bag to expand from a collapsed condition to an inflated condition. In one instance, causing the chemically-inflatable bag to expand includes manually grasping the chemically-inflatable bag and generating a force on the fluid-containing device by applying a force to the removable cap portion. The application of such a force causes the release of the fluid from the fluid-containing device. During this displacement, the second reacting agent (e.g. liquid substance) is introduced into the chemically-inflatable bag and to the first reacting agent (e.g., solid or powdered substance). This introduction of the first and second reacting agents, and subsequent intermixing, invokes a chemical reaction that produces a quantity of gas capable of expanding the chemically-inflatable bag to an inflated condition.

In one instance, the first and second reacting agents may be several types of chemical agents including, but not limited to, a sodium bicarbonate and an acid, such as vinegar. Further, the expansion may be assisted by an inflation device, such as an aerosol can or any other typical acid-based reaction. In the instance above, combining the first and second reacting agents initiates a chemical reaction that generates a byproduct of carbon dioxide. Generally, the first and second reacting agents are premeasured such that the chemical reaction generates sufficient amounts of carbon dioxide to fully expand the chemically-inflatable bag to the inflated condition. When expanded to the inflated condition, an outer surface of the chemically-inflatable bag contacts walls of the formed cavity and frictionally fix the chemically-inflatable bag thereto. Thus, the chemically-inflatable bag acts as an obstruction to solids or liquids entering the formed cavity and to erosion of walls of the formed cavity.

Additional objects, advantages, and novel features of the invention will be set forth in the description that follows and in part will become apparent to those skilled in the art upon examination of the following, or may be learned by practice of the invention.

BRIEF DESCRIPTION OF THE DRAWINGS

Illustrative embodiments of the present invention are described in detail below with reference to the attached drawing figures, which are incorporated by reference herein. In the accompanying drawings, which form a part of the specification and which are to be read in conjunction therewith, and in which like reference numerals are used to indicate like parts in the various views.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or varying components/materials similar to the ones described in this document, in conjunction with other present or future technologies.

Embodiments of the present invention provide an apparatus for facilitating a non-labor intensive and novel process for inflating a self-inflating plug, also known as a chemically-inflatable bag, used to prevent backfill entering, or environmental factors eroding walls of a cavity formed in the ground. Generally, embodiments of the present invention relate to embodiments of a cap for a fluid-containing device that is contained within a chemically-inflatable bag.

Figure 1:
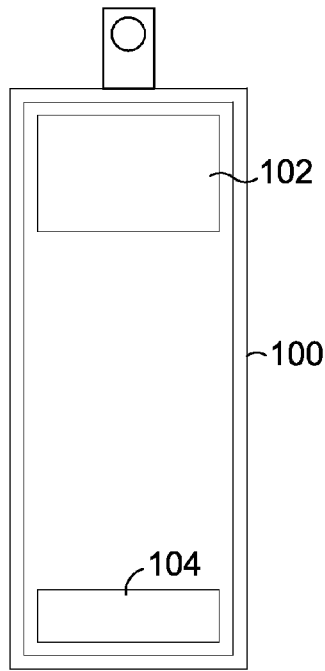
FIG. 1 is a cross section view of a chemically-inflatable bag in accordance with embodiment of the prior art.
Figure 2:
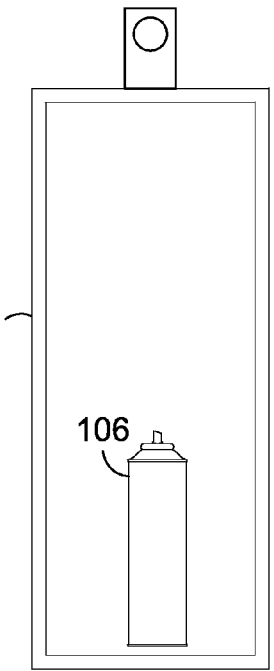
FIG. 2 is a cross section view of a chemically-inflatable bag in accordance with an alternate embodiment of the prior art.
Figure 3:
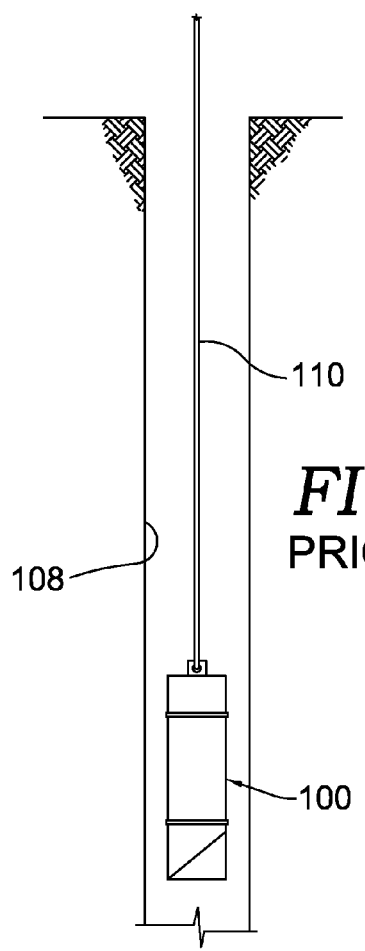
FIG. 3 is a cross section view of a borehole and a chemically-inflatable bag in accordance with an embodiment of the prior art.

Referring back to FIGS. 1-3, a self-inflating plug 100 of the prior art is shown. The self-inflating plug 100 is a folded nylon bag having a high density polyethylene (HDPE) bag 102 that contains an acid and a polyvinyl alcohol (PVA) water soluble bag 104 that contains sodium bicarbonate. The acid mixes with the sodium bicarbonate upon the breaking or leaking of the acid from the HDPE bag 102. FIG. 2 depicts the self-inflating plug 100 incorporating an aerosol device 106 for use in inflating the self-inflating plug. As discussed above, the self-inflating plug 100 can be used to secure an opening, such as a borehole plug, as depicted in FIG. 3. The self-inflating plug 100 is dropped into a borehole 108 by a rope or cord 110, where it inflates to seal the borehole 108. However, as discussed above, the means by which the acid mixes with the sodium bicarbonate in the self-inflating plug 100 was previously inconsistent and unreliable, which prevented complete inflation of the self-inflating plug.

Improvements to the means by which the acid can mix with the sodium bicarbonate is addressed by the improvements provided in the present invention discussed below and depicted in FIGS. 4-14. More specifically with reference to FIGS. 4-6, a cap 200 for sealing an opening of a fluid-containing device contained within a chemically-inflatable bag is disclosed. The cap 200 comprises an attachment means 202 for removably securing the cap 200 to the fluid-containing device (not depicted). An example of a fluid-containing device is depicted in FIGS. 7-9 and will be discussed in more detail below.

Figure 4:
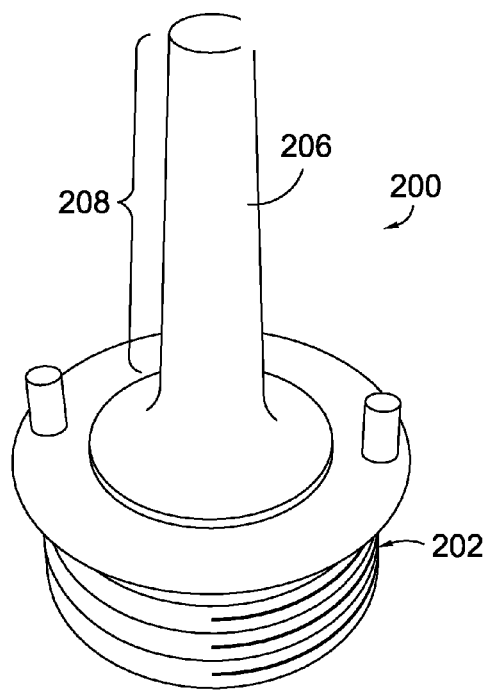
FIG. 4 is a perspective view of a cap for a fluid-containing device in accordance with an embodiment of the present invention.
Figure 5:
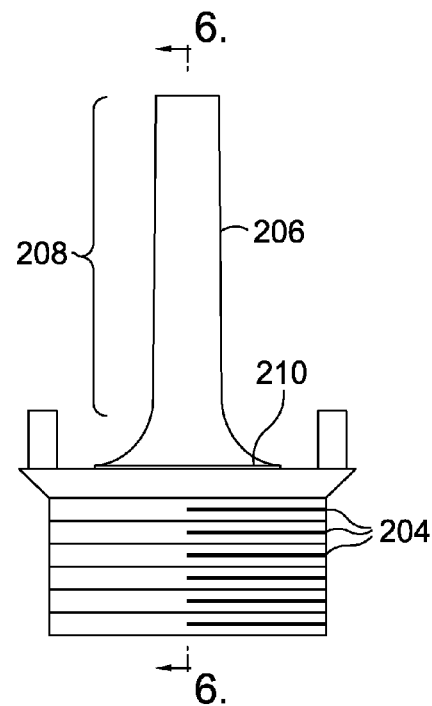
FIG. 5 is a side elevation view of the cap of FIG. 4 in accordance with an embodiment of the present invention.
Figure 6:
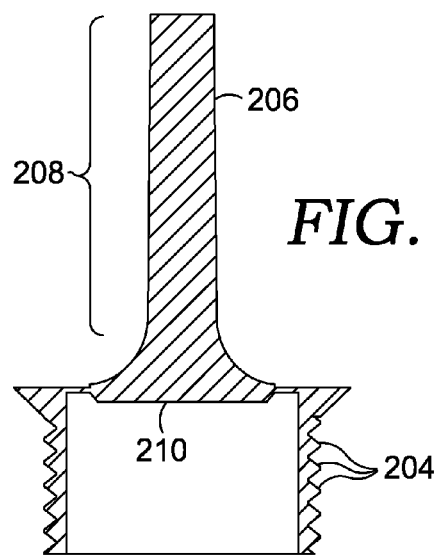
FIG. 6 is a cross section view taken through the cap of FIG. 5 in accordance with an embodiment of the present invention.

The cap 200 of FIGS. 4-6 is preferably secured to the fluid-containing device through a plurality of threads 204 positioned on an outer diameter of the attachment means 202. Such an attachment configuration is possible where the cap has a cylindrical cross sectional shape. The plurality of threads 204 engage a corresponding threaded opening of the fluid-containing device.

The cap 200 also comprises a tip portion 206 that extends from the attachment means 202 and has a tip length 208. The tip portion 206 extends a sufficient length 208 so as to provide a portion of the tip length 208 which is breakable. The tip length 208 is preferably solid and includes a blocking plate 210 for closing against an opening of a fluid-containing device. Upon a breaking of the tip length 208, the tip length and blocking plate are generally removed from the opening of the fluid-containing device in a way that fluid from within the fluid-containing device exits into the chemically-inflatable bag and mixes with a reacting agent contained in the chemically-inflatable bag. The cap 200 can be fabricated from a variety of materials, but due to the nature of the fluid in the fluid-containing device, it is preferred that the cap 200 is fabricated from a plastic material.

Figure 7:
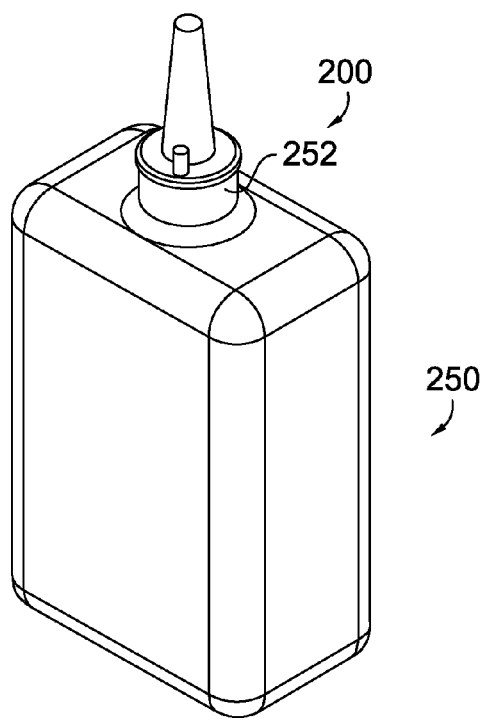
FIG. 7 is a perspective view of a fluid-containing device incorporating the cap of FIGS. 4-6 in accordance with an embodiment of the present invention.
Figure 8:
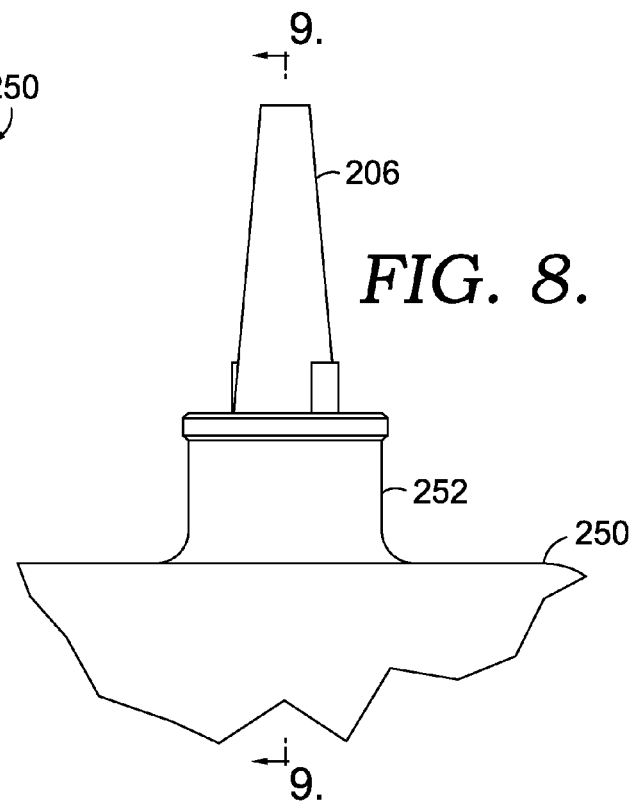
FIG. 8 is a side elevation view of a portion of the fluid-containing device of FIG. 7 in accordance with an embodiment of the present invention.
Figure 9:
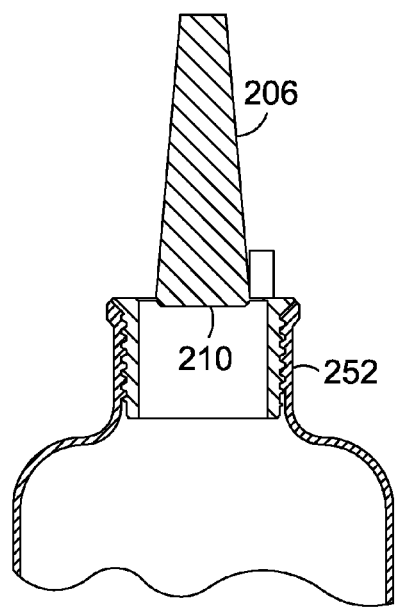
FIG. 9 is a cross section view of a portion of the fluid-containing device of FIG. 8 in accordance with an embodiment of the present invention.

Referring now to FIGS. 7-9, an embodiment of the present invention depicts the fluid-containing device of the present invention. More specifically, FIG. 7, depicts a fluid containing device 250 having a cap 200 attached, as previously discussed. As shown in FIGS. 8 and 9, the cap 200 is secured to the fluid-containing device 250 such that the blocking plate 210 and tip portion 206 prevent the fluid from exiting the fluid-containing device 250.

The fluid-containing device 250 can take on a variety of shapes and sizes. One such configuration is shown in FIG. 7 and is a bottle-like design having an opening 252 in which the attachment means 202 of the cap 200 is secured. Other forms of the fluid-containing device 250 can include a soft-sided container such as a bag or other type of hard-sided container. While the fluid-containing device can contain any type of fluid, as discussed above, it is preferred that the fluid-containing device 250 contains an acid. One such example of an acid is vinegar.

Figure 10:
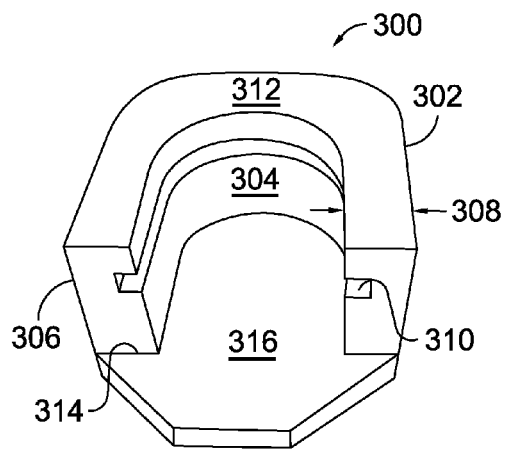
FIG. 10 is a perspective view of a cap for a fluid-containing device in accordance with an alternate embodiment of the present invention.
Figure 11:
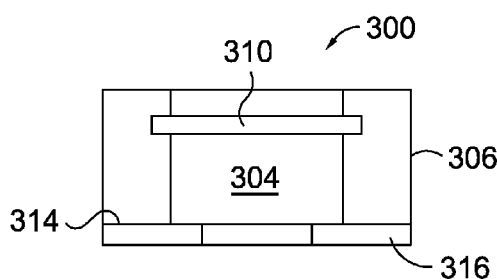
FIG. 11 is an elevation view of the cap for a fluid-containing device in accordance with an alternate embodiment of the present invention.
Figure 12:
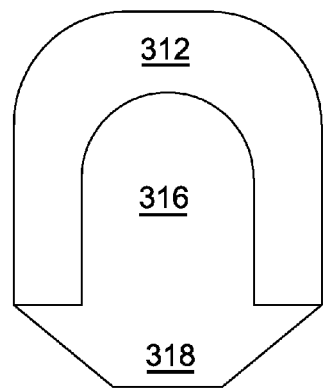
FIG. 12 is a top view of the cap for a fluid-containing device in accordance with an alternate embodiment of the present invention.

An alternate embodiment of the cap of the present invention for sealing an opening in a fluid-containing device of a chemically-inflatable bag is shown in FIGS. 10-13. The removable cap 300 comprises a generally collar-shaped member 302 having an inner wall 304 and an opposing outer wall 306. As such, the generally collar-shaped member 302 has a collar thickness 308. For the embodiment shown in FIGS. 10-13, the generally collar-shaped member 302 is U-shaped. However, it is envisioned that alternate shapes for the collar-shaped member can be used. As shown in FIGS. 10 and 11, the generally collar-shaped member 302 also comprises a recessed slot 310 formed along the inner wall 304 and extending a distance into the thickness 308 of the generally collar-shaped member 302. This recessed slot 310 is used in securing the removable cap 300 to a fluid-containing device, as will be discussed further below.

Figure 13:
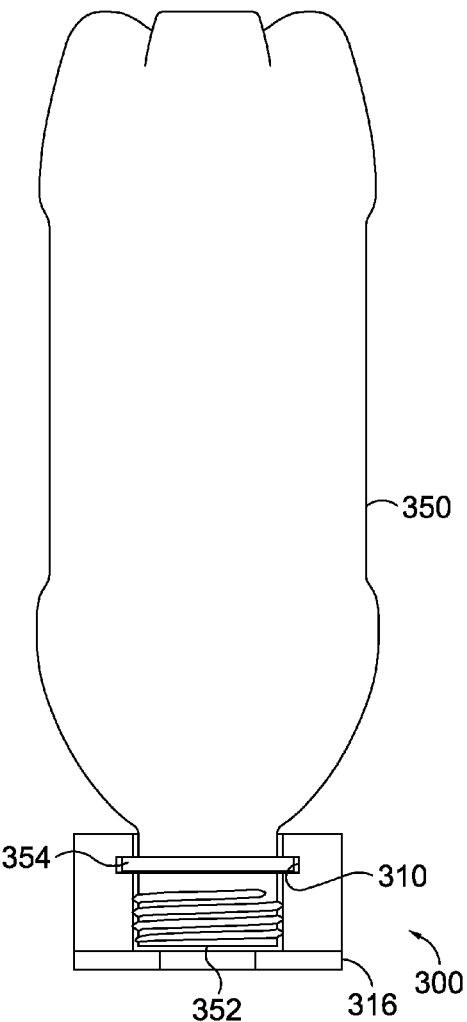
FIG. 13 is an elevation view of a fluid-containing device incorporating the cap of FIGS. 10-12 in accordance with an alternate embodiment of the present invention.

The generally collar-shaped member 302 also has a first face 312 and an opposing second face 314 with a backplate 316 being secured to the second face 314. The backplate 316 provides a surface of the removable cap 300 for capping off or sealing an adjacent fluid-containing device. The backplate 316 also comprises a lip 318 that extends in a direction beyond the inner and outer walls, 304 and 306, respectively, of the generally collar-shaped member 302. The lip 318 and its function will be discussed in more detail below. More specifically, as shown in FIG. 13, the removable cap 300 is positioned about a fluid-containing device 350 having an opening 352 such that the recessed slot 310 is sized to slidably engage the fluid-containing device 350. For the embodiment shown in FIG. 13, a collar 354 slides into and out of the recessed slot 310. As such, when the collar 354 is placed within the recessed slot 310, the backplate 316 of the generally collar-shaped member 302 is positioned against the opening 352 of the fluid-containing device 350 preventing any fluid within the fluid-containing device 350 from exiting. As with the previous embodiments discussed above, the fluid-containing device 350 is not limited to a bottle-shape as disclosed in FIG. 13, but could include other devices, including but not limited to, a plastic bag. As with other embodiments of the present invention, the removable cap 300 can be fabricated from a variety of materials, but is preferably fabricated from a plastic material.

For the embodiment depicted in FIGS. 10-13, the removable cap 300 is used to seal a liquid in the fluid-containing device 350 until it is needed to help inflate the chemically-inflatable bag. More specifically, the recessed slot 310 of the generally collar-shaped member 302 engages a corresponding collar 354 of the fluid-containing device 350 such that the backplate 316 covers the opening 352 of the fluid-containing device 350. With the removable cap 300 having a generally collar-shaped configuration, the cap 300 can be removed from the fluid-containing device 350 by application of a force to the lip 318 of the backplate 316 and/or to the open side of the generally collar-shaped member 302, such that the recessed slot 310 slides relative to the collar 354, thereby removing the backplate 316 from covering the opening 352.

Figure 14:
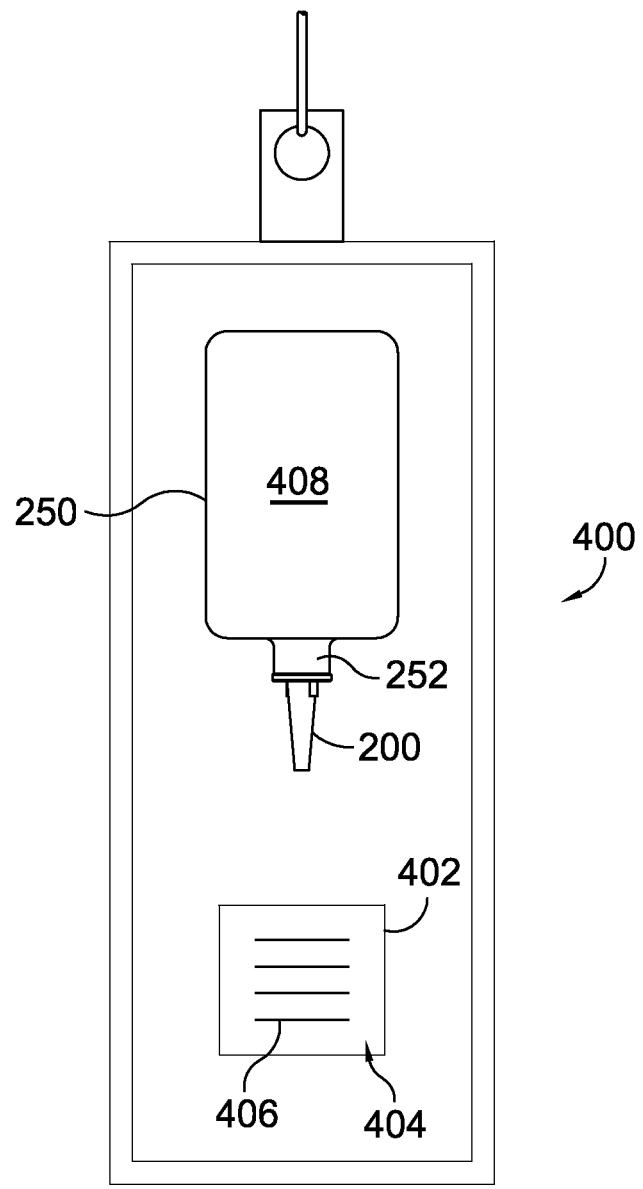
FIG. 14 is an elevation view of a chemically-inflatable bag in accordance with an embodiment of the present invention.

Referring now to FIG. 14, a chemically-inflatable bag 400 for use as a type of plug is depicted. As discussed above, in operation, the chemically-inflatable bag initially contains two separate and discrete reactants. The chemically-inflatable bag 400 comprises a first reacting agent 404, which can be a solid/powder comprising sodium bicarbonate. The first reacting agent 404 can be placed directly in the chemically-inflatable bag 400, it can be located in a water soluble bag 402, or both. The water soluble bag 402 can also comprise a plurality of openings 406, such as slits for accessing the first reacting agent 404 within the water soluble bag 402. Additional solid/powder of the first reacting agent 404 is placed loose within the chemically-inflatable bag 400 in order to help initiate the chemical reaction and to help ensure a complete reaction.

The first and second reacting agents placed within the chemically-inflatable bag are premeasured to ensure that the proper amount of reactants are being used. The premeasured amount may be based on the type of reactants being used, the concentration of the reactants, or any other attributes or characteristics of the reactants that influence the behavior of the chemical reaction therebetween.

The chemically-inflatable bag 400 also comprises a fluid-containing device, as discussed above. For explanatory purposes, the chemically-inflatable bag 400 utilizes the fluid-containing device 250 of FIGS. 7-9, but could also utilize other fluid-containing devices and removable caps as discussed herein. That is, the fluid-containing device 250 has an opening 252 and a removable cap 200, as previously discussed, but could also use removable cap 300. The fluid-containing device 250 has a second reacting agent 408 therein, where the second reacting agent 408 is preferably an acid, such as vinegar.

Initially, the chemically-inflatable bag is in a collapsed condition and may even be in a folded state. When in an appropriate position, such as proximate a cavity formed in the ground that is to be sealed, the bag is unfurled or prepared to be dropped into the opening to be sealed. This sealing does not occur until the bag inflates through a chemical reaction.

As discussed above, the cap 200 is removable. Upon application of a force to the cap 200, the cap is removed or broken off of the opening 252 of the fluid-containing device 250 such that fluid (the second reacting agent) is permitted to flow through the opening 252 and contact the first reacting agent 404 and/or the water soluble bag 402. The acid of the second reacting agent permeates the water soluble bag 402 as well as enters through the openings 406 in the water soluble bag 402. The permeation and dissolution of the water-soluble bag 402 generally takes approximately 30 seconds, providing an operator with sufficient time to place the chemically-inflatable bag in the desired location prior to the bag inflating.

Sufficient force can be applied to the cap 200 from outside the folded or unfolded, but sealed, chemically-inflatable bag. When the second reacting agent 408 contacts the first reacting agent 404, a chemical reaction occurs, the byproduct of which is carbon dioxide. The carbon dioxide expands the chemically-inflatable bag 400 from a collapsed condition to an inflate condition. In the inflated condition, the chemically-inflatable bag 400 plugs the borehole and/or obstructs foreign items from entering a formed cavity.

The removable cap can be fabricated from a variety of materials given the necessary operating conditions for the removable cap and chemically-inflatable bag. That is, since the liquid present in the fluid-containing device is preferably an acid, the cap material must be able withstand the acidic conditions for extended periods of time. Furthermore, depending on the physical design of the removable cap, it is necessary that the removable cap be fabricated from a material that can be broken by a user such that it is removable from the fluid-containing device upon application of a force. Generally, a plastic material will meet these requirements and is therefore preferable.

The material(s) chosen for construction of the chemically-inflatable bag are generally sufficiently stable so as to be gas impermeable for an extended length of time consistent with the typical operation of the chemically-inflatable bag (i.e., remaining at a fully inflated volume until the blocked hole is accessed). Such materials generally include nylon or those with nylon attributes. Alternatively, since the byproduct of the chemical reaction occurring within the chemically-inflatable bag is $CO_2$, other materials that are $CO_2$ barriers may also be used within the chemically-inflatable bag. However, it should be understood that any suitable material may be used.

In embodiments of the present invention, the chemically-inflatable bag 400 can be assembled with varied reacting agents. The first reacting agent 404 may be sodium bicarbonate powder, which is placed in the water soluble bag 402 and sealed, or is placed directly in the chemically-inflatable bag 400. Next, the second reacting agent 408 may be technical grade acid that is diluted with water to 16% v/v, which is poured into the first section fluid-containing device 250 and sealed by removable cap 200. Accordingly, the sodium bicarbonate and the acid are secured at the opposite ends of the chemically-inflatable bag 400.

By way of example, the chemically-inflatable bag 400, when expanded, may have an outer circumference within the range of 18 to 24 inches in diameter and a length of up to 6 feet. However it should be understood that virtually any diameter and any length of the chemically-inflatable bag 400 could be used. Further, the chemically-inflatable bag 200 may be shaped and sized in any manner when expanded (e.g., cube, sphere, and the like) to accommodate the shape and size of the destination-formed cavity, and is not limited to a cylinder.

In other embodiments, the chemically-inflatable bag 400 is substantially gas-tight and is of a shape such that it can be placed into a formed cavity upon completion of expansion to the inflated condition. Or, the chemically-inflatable bag 400 may be configured in size and shape such that its outer surface does not fully inflate and fully expand to an inner circumference of the formed cavity until the chemical reaction is exhausted and the chemically-inflatable bag 400 is just reaching a full inflation.

The description above depicts examples of various chemically-inflatable bags 400 and removable caps for the fluid-containing device within the chemically-inflatable bag. These examples are not meant in any way to limit the scope of this invention. Further, while not meant to be limiting, the chemically-inflatable bag 400 may be deployed in any environment and, once deployed, may withstand environmental factors for a duration of time that is greater than a maximum lag time between drilling a hole in a construction setting and installing an item in the hole for which it was drilled.

From the foregoing, it will be seen that this invention is one well-adapted to attain all the ends and objects herein above set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. A cap for sealing an opening of a fluid-containing device, the opening having a diameter, the cap contained within a chemically-inflatable bag comprising:
    a cap base portion, the base portion being directly and removably attached to the fluid-containing device proximate the opening, said cap base portion having a width, a first end and a first end opening; and
    a cap solid tip portion directly connected to and extending from the cap base portion in an outward direction from the fluid-containing device, said cap solid tip portion having a tip distal portion having a width, a tip base portion having a width, and an interior end, the tip distal portion width being less than the tip base portion width, the tip base portion interior end being adjacent the cap base portion first end opening leaving a cap base portion interior space between the tip base portion interior end and the fluid-containing device opening, the tip base portion width being less than the cap base portion width at the cap base portion first end,
    wherein breaking the cap solid tip portion from the cap base portion causes substantially all of the tip base portion to be removed from the cap base portion first end opening,
    wherein the cap base portion first end opening is at least one fourth the fluid-containing device maximum width, and
    wherein upon the breaking fluid from within the fluid-containing device exits into the chemically-inflatable bag and mixes with a reacting agent contained in the chemically-inflatable bag in order to inflate the chemically-inflatable bag.

2. The cap of claim 1, wherein the cap has a cylindrical cross sectional shape.

3. The cap of claim 2, wherein the cap base portion further comprises a plurality of threads positioned on an outer diameter of the cap base portion.

4. The cap of claim 3, wherein the fluid-containing device has an opening corresponding to a size and shape of the cap.

5. The cap of claim 1, wherein the fluid in the fluid-containing device is an acid.

6. The cap of claim 1, wherein the cap is fabricated from a plastic material.

7. The cap of claim 1, wherein the cap solid tip portion further comprises a blocking plate.

8. A chemically-inflatable bag for a borehole plug comprising:
- a first reacting agent; and
- a fluid-containing device positioned within the chemically-inflatable bag, the fluid-containing device having an opening, a removable cap being directly and removably secured to the fluid-containing device, and a fluid contained therein, said removable cap comprising:
- a cap base portion proximate the opening of the fluid-containing device, said cap base portion comprising a width and a base opening; and
- an exterior portion directly connected to and extending from the cap base portion in an outward direction from the fluid-containing device, said exterior portion comprising a first end having a width, and a second end having a width, the second end width being less than the first end width, the first end being adjacent the base opening leaving a removable cap interior space between the first end and the fluid containing device opening, the first end width being less than the cap base portion width, wherein breaking the exterior portion from the cap base portion causes substantially all of the exterior portion to be removed from the base opening, wherein the base opening is at least one fourth the fluid-containing device maximum width, wherein the fluid is a second reacting agent, and wherein upon the breaking, the fluid flows through the opening of the fluid-containing device such that the second reacting agent mixes with the first reacting agent causing the chemically-inflatable bag to inflate.

9. The chemically-inflatable bag of claim 8, wherein the first reacting agent is in a water soluble bag positioned within the chemically-inflatable bag.

10. The chemically-inflatable bag of claim 9, wherein the water soluble bag further comprises a plurality of openings.

11. The chemically-inflatable bag of claim 8, wherein the first reacting agent in the water soluble bag is sodium bicarbonate.

12. The chemically-inflatable bag of claim 8, wherein the second reacting agent in the fluid-containing device is an acid.

* * * * *